US012089017B2

(12) United States Patent
Horbach

(10) Patent No.: US 12,089,017 B2
(45) Date of Patent: Sep. 10, 2024

(54) METHOD FOR DESIGNING A LINE ARRAY LOUDSPEAKER ARRANGEMENT

(71) Applicant: Harman Becker Automotive Systems GmbH, Karlsbad (DE)

(72) Inventor: Ulrich Horbach, Oberschneiding (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 121 days.

(21) Appl. No.: 17/881,002

(22) Filed: Aug. 4, 2022

(65) Prior Publication Data

US 2023/0050161 A1 Feb. 16, 2023

(30) Foreign Application Priority Data

Aug. 16, 2021 (EP) .................................... 21191526

(51) Int. Cl.
*H04R 3/04* (2006.01)
*H04R 1/40* (2006.01)
*H04R 29/00* (2006.01)

(52) U.S. Cl.
CPC ............... *H04R 3/04* (2013.01); *H04R 1/403* (2013.01); *H04R 29/002* (2013.01)

(58) Field of Classification Search
CPC ......... H04R 3/04; H04R 1/403; H04R 29/002
See application file for complete search history.

(56) References Cited

U.S. PATENT DOCUMENTS

| | | |
|---|---|---|
| 4,289,929 A | 9/1981 | Hathaway |
| D262,793 S | 1/1982 | Hathaway et al. |
| D391,962 S | 3/1998 | Borys |
| D394,860 S | 6/1998 | Kitsmiller et al. |
| D466,885 S | 12/2002 | MacFarlane et al. |

(Continued)

FOREIGN PATENT DOCUMENTS

| | | |
|---|---|---|
| JP | 2017152857 A | 8/2017 |
| WO | 2018045133 A1 | 3/2018 |

OTHER PUBLICATIONS

Extended European Search Report dated Jan. 20, 2021 for European Patent Application No. 20194322.2, 11 pages.

(Continued)

*Primary Examiner* — David L Ton
(74) *Attorney, Agent, or Firm* — Brooks Kushman P.C.

(57) ABSTRACT

A method for designing a line array loudspeaker arrangement comprises providing a loudspeaker arrangement based on design start parameters and including at least a vertical front array and measuring the frequency responses of the loudspeaker arrangement with bypassed or omitted electronic filters at predefined horizontal angle increments. The method further comprises computing combined beam forming and crossover filter frequency responses for the vertical front array based on the measured frequency responses of the loudspeaker arrangement and first target frequency responses at various frequency points and various positions; and computing combined equalizing and crossover filter frequency responses for the vertical front array based on second target frequency responses, the combined equalizing and crossover filter frequency responses being configured to obtain acoustic linear phase responses of the loudspeaker arrangement.

20 Claims, 11 Drawing Sheets

(56) References Cited

U.S. PATENT DOCUMENTS

| | | | | |
|---|---|---|---|---|
| D471,888 | S | 3/2003 | Solland | |
| D491,918 | S | 6/2004 | Solland | |
| D595,263 | S | 6/2009 | Jiang | |
| 7,991,170 | B2 | 8/2011 | Horbach | |
| 8,150,068 | B2 * | 4/2012 | Konagai | H04S 3/002 381/99 |
| D754,099 | S | 4/2016 | Sung et al. | |
| D758,347 | S | 6/2016 | Hinokio | |
| 9,749,747 | B1 | 8/2017 | Kriegel et al. | |
| D798,931 | S | 10/2017 | Kim et al. | |
| D838,690 | S | 1/2019 | Cheon et al. | |
| D842,903 | S | 3/2019 | You | |
| D853,354 | S | 7/2019 | Demin | |
| 2006/0251272 | A1 * | 11/2006 | Horbach | H04R 3/12 381/99 |
| 2007/0263889 | A1 * | 11/2007 | Melanson | H04S 7/301 381/300 |
| 2010/0329480 | A1 * | 12/2010 | Boone | H04R 1/403 381/94.1 |
| 2017/0164100 | A1 * | 6/2017 | Franck | H04R 3/12 |
| 2017/0201830 | A1 * | 7/2017 | Ojala | H04R 29/002 |
| 2017/0238090 | A1 | 8/2017 | Johnson et al. | |
| 2020/0107121 | A1 * | 4/2020 | Choisel | H04R 3/04 |

OTHER PUBLICATIONS

Extended European Search Report dated Feb. 14, 2022 for European Patent Application No. 21191526.9, 11 pages.

Taylor, R. et al., "Circular-Arc Line Arrays With Amplitude Shading for Constant Directivity", J. Audio Eng. Soc., Jun. 9, 2019, 14 pages, vol. 67, No. 6.

Van Der Wal, M. et al., "Design of Logarithmically Spaced Constant-Directivity Transducer Arrays", J. Audio Eng. Soc., Jun. 1996, 11 pages, vol. 44, No. 6.

Williams, E. G., "Fourier Acoustics", Academic Press, 1999, 321 pages.

Non-Final Office Action for U.S. Appl. No. 17/001,165, dated Oct. 4, 2021, 14 pages.

Summons to attend oral proceedings dated May 21, 2024 for European Application No. 20194322.2 filed Sep. 3, 2020, 7 pgs.

Korean Office Action dated Jul. 19, 2024 for Korean Application No. 10-2020-0110794 filed Sep. 1, 2020, 14 pgs.

* cited by examiner

METHOD FOR DESIGNING A LINE ARRAY LOUDSPEAKER ARRANGEMENT

CROSS-REFERENCE TO RELATED APPLICATIONS

This application claims priority to EP application Serial No. 21191526.9 filed Aug. 16, 2021, the disclosure of which is hereby incorporated in its entirety by reference herein.

TECHNICAL FIELD

The disclosure relates to a method for designing a line array loudspeaker arrangement.

BACKGROUND

Conventional box-shaped loudspeaker arrangements having multiway crossovers in connection with specialized loudspeakers such as woofers, midranges, tweeters, and with passive crossover filters only allow control over their frequency responses (also referred to as responses, transfer functions, functions or characteristics) outside of the main, frontal axis to a very limited degree. Due to diffraction effects, frequency responses measured horizontally around the enclosure depend on enclosure shape, width and depth, and, in particular, rear responses exhibit a low pass characteristic that appears not smooth but often rough and fissured. Responses observed vertically above and below the main axes deviate from desired flat, smooth responses as well, mostly because of interferences between the non-coincident multiway loudspeakers. Designing loudspeakers involves manual tuning of all available parameters until a certain desired sound signature is achieved. This procedure, called "voicing", is generally very tedious, and seldom leads to a truly accurate and naturally sounding product. An analytic design method for loudspeaker arrangements is desired that allows to produce desired frequency responses directly at any given point in space.

SUMMARY

A method for designing a line array loudspeaker arrangement is presented The loudspeaker arrangement comprises electronic filters and a loudspeaker enclosure equipped with loudspeakers. The loudspeakers are connected downstream of the filters, have a membrane, and are arranged to form at least one array. The method comprises providing design start parameters including a number of loudspeaker arrays, a number of loudspeakers per array, distances between loudspeakers per array and loudspeaker membrane sizes per array; providing a loudspeaker arrangement based on the design start parameters and including at least a vertical front array; and measuring the frequency responses of the loudspeaker arrangement with bypassed or omitted electronic filters at predefined horizontal angle increments. The method further comprises computing combined beam forming and crossover filter frequency responses for the vertical front array based on the measured frequency responses of the loudspeaker arrangement and first target frequency responses at various frequency points and various positions. The first target frequency responses being constant-beamwidth transducer target frequency responses that specify desired frequency responses of the loudspeaker array to be designed. The method further comprises computing combined equalizing and crossover filter frequency responses for the vertical front array based on second target frequency responses. The second target frequency responses being the combined beam forming and crossover filter frequency responses for the vertical front array, and the combined equalizing and crossover filter frequency responses being configured to obtain acoustic linear phase responses of the loudspeaker arrangement. The method further comprises computing horizontal beam forming filter frequency responses based on third target frequency responses. The third target frequency responses specifying desired horizontal frequency responses of the loudspeaker array to be designed; and arranging the electronic filters based on the combined beam forming and crossover filter frequency responses for the vertical front array, the equalizing and crossover filter frequency responses, and the horizontal beam forming filter frequency responses.

Other methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The method may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

In order to control the vertical radiation pattern of a loudspeaker arrangement (herein also referred to as system), a vertical beamforming crossover design is employed. It is desirable to combine a traditional loudspeaker array design having specialized (multiway) loudspeakers such as, for example, tweeters, midranges and woofers, with an array control technique such as, for example, a beamforming technique, so that not only the directivity and smoothness of out-of-axis responses, but also other requirements such as low distortion across the frequency band, efficiency and maximum sound power level at a given enclosure size can be satisfied.

Some traditional array design techniques require identical wideband transducers across the array as described in R. Taylor, K. Manke, D. B. Keele, "Circular-Arc Line Arrays with Amplitude Shading for Constant Directivity". J. Audio Eng. Soc., Vol. 67, No. 6, June 2019, and M. Van der Wal, E. Start, D. De Vries, "Design of logarithmically spaced constant-directivity transducer arrays", J.A.E.S. Vol. 44 No. 6, June 1996. A linear-phase design technique for multiway loudspeakers as disclosed, for example, in U.S. Pat. No. 7,991,170 may disclose very tight spacing in the center, does not allow the use of large, powerful transducers, and demands low crossover frequencies, which may result in impaired power handling and low achievable loudness level.

Figure 1:
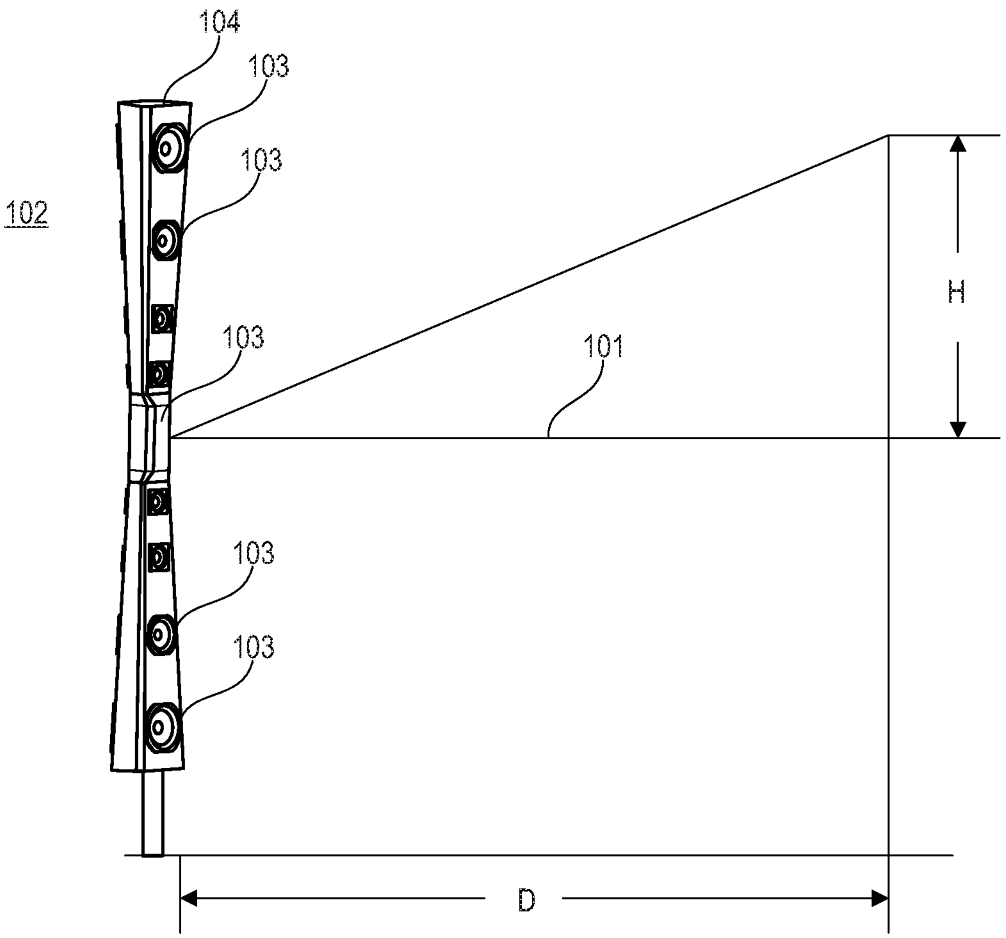
FIG. 1 is a schematic diagram illustrating listening distance and listening window relative to an exemplary loudspeaker arrangement.

These limitations are overcome with the methods described herein. The implementations provided by these methods are optimized for a prescribed listening distance D and a vertically and horizontally extending (only the vertical dimension is shown in FIG. 1) listening window having at the listening point a height (zero to H) measured from a center axis 101 of an exemplary loudspeaker arrangement 102, as depicted in FIG. 1. The methods presented herein are based on the following considerations:

Initially, an array of multiple loudspeakers may be determined in order to control vertical directivity. This array, herein referred to as "Generalized Line Array (GLA)", is largely unrestricted in terms of loudspeaker type (e.g., frequency range), number and spacing. Multiple (i.e., at least two) such arrays may be arranged in a common cabinet and combined with array filter sets to control horizontal responses and counteract diffraction. In the exemplary loudspeaker arrangement 102 shown in FIGS. 1 and 2, which only depict a front array thereof, multiway loudspeakers 103, i.e., specialized loudspeakers such as tweeters, midranges and woofers, are arranged in a cabinet 104 and array-wise in line with each other to form a front array, where the highest frequency loudspeakers are disposed close to or in the center, and the lowest frequency loudspeakers are close to the vertically opposing edges of the loudspeaker arrangement 102. As can be seen from FIG. 2, not only one but also multiple (i.e., at least two) loudspeakers are allowed at each position, where the membrane diameters of the loudspeakers at each position are summed up. As shown, there may be, for example, a vertical arrangement of two transducers at position 0 and horizontal arrangements of two transducers at vertical positions $x_2, \ldots x_{Dm}$. In the front array shown in FIG. 2, the two loudspeakers at each of vertical positions $x_2, \ldots x_{Dm}$ are horizontally shifted by ±45° related to the position of the loudspeakers at vertical positions 0 and $x_1$. This results in convex (arc-shaped) distributions of the loudspeakers 103 around a vertical axis of the cabinet 104. Further, as the front side of the cabinet 104 is curved inwardly from the bottom to the top, there is a concave (arc-shaped) distribution of the loudspeakers 103 around a horizontal axis of the cabinet 104.

Figure 2:
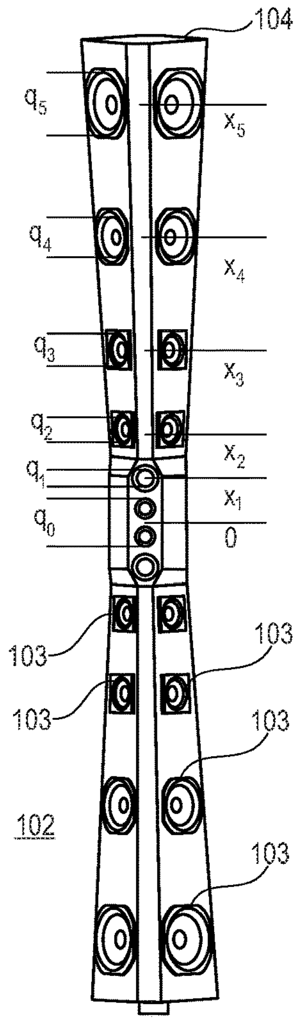
FIG. 2 is a schematic diagram illustrating the exemplary loudspeaker arrangement shown in FIG. 1 in greater detail.

Driver placement may start with a "best guess" of loudspeaker choice and placement, for example, symmetrical by a center tweeter at (not shown) or two center speakers (as shown) around a position zero (0), and with a definition of a vertical position vector $X=[x_1, \ldots x_{Dm}]$, wherein $D_m$ (e.g., $D_m=5$) is the number of (pairs of) loudspeaker positions above and below zero, respectively. Further, as also shown in FIG. 2, the respective membrane diameters of the loudspeakers are specified by a vector $Q=[q_0, q_1, \ldots q_{Dm}]$, and the total number of loudspeaker positions is specified by $M=2D_m+1$.

Constant-beamwidth transducers (CBT) are curved-surface transducers in the form of a spherical cap with frequency-independent Legendre shading, or as herein, Squared Cosine Shading that provides wide-band constant beamwidth and directivity behavior with virtually no side lobes. CBT arrays employ amplitude shading (gain factors) and geometrically realized delays (via an arc-shaped enclosure) to achieve a desired beam shape as detailed, for example, in R. Taylor, K. Manke, D. B. Keele, "Circular-Arc Line Arrays with Amplitude Shading for Constant Directivity". J. Audio Eng. Soc., Vol. 67, No. 6, June 2019. Logarithmic arrays are based on a bank of low pass filters as detailed, for example, in M. Van der Wal, E. Start, D. De Vries, "Design of logarithmically spaced constant-directivity transducer arrays", J.A.E.S. Vol. 44 No. 6, June 1996. Conventional loudspeaker crossover arrangements employ band pass filter designs having high passes and low passes.

In the exemplary methods described herein, four parameters per loudspeaker channel (corresponding to a pair of loudspeaker positions) of an array, delays Dl, levels W, frequency responses of high passes $H_{HP}$ and frequency responses of low passes $H_{LP}$, are combined with each other to compose a set of crossover frequency responses $H_c(i)=Dl(i)\cdot W(i)\cdot H_{HP}(i)\cdot H_{LP}(i)$, i=1 . . . M, characterized by a delay vector $d_d=[d_{Dm}, \ldots d_1, 0, d_1, \ldots d_{Dm}]$, a level vector $w_d[w_{Dm}, \ldots w_1, 1, w_1, \ldots w_{Dm}]$, a high pass corner frequency vector $f_d=[f_{Dm}, \ldots f_1, f_0, f_1, \ldots f_{Dm}]$, and a low pass coefficient vector $g_d=[g_{Dm}, \ldots g_1, 0, g_1, \ldots g_{Dm}]$.

From these parameters, individual (filter) frequency responses can be derived:

a) Delays $Dl(i,f)=e^{-j2\pi f/c\cdot di}$, i=0 . . . Dm, f=(1 . . . N)/N·(fs/2), wherein c represents the speed of sound, fs represents a sample frequency, and N represents a number of discrete frequency sampling points.

b) Levels $W(i,f)=w_i$.

c) High pass frequency responses $H(f_i,f)$ are, for example, magnitude frequency responses of Butterworth high passes of degree n and corner frequency $f_i$. Other high pass crossover filters can be used as well, depending on choice of loudspeakers and overall filter design (Bessel, Tchebychev etc). Since the filter designs are linear-phase, the phase responses of the prototype high passes are discarded.

d) Similar to logarithmic array designs described in M. Van der Wal, E. Start, D. De Vries, "Design of logarithmically spaced constant-directivity transducer arrays", J.A.E.S. Vol. 44 No. 6, June 1996, the low pass frequency responses are based on a window function, for example a Kaiser window $W_K(f, \beta)$. The parameter β is a fixed choice for the array design, and can be used to modify beam width. This results in low pass filter responses $\hat{H}_{LP}(i, f)$, wherein $$\hat{H}_{LP}(i, f) = W_k(x),\ x = \begin{cases} b, & b \le N \\ N, & b > N \end{cases},\ b = \frac{N}{2} + g_i \cdot f.$$

A normalization is applied to the low pass filter responses $\hat{H}_{LP}(i, f)$ to ensure that the sum of all low pass functions at a given frequency point is 1, which results in the normalized low pass frequency response $H_{LP}(i, f_k)$ according to:

$$H_{LP}(i, f_k) = \frac{\hat{H}_{LP}(i, f_k)}{\sum_{i=1}^{M} \hat{H}_{LP}(i, f_k)}\ \forall\ k = 1 \ldots N.$$

Figure 3:
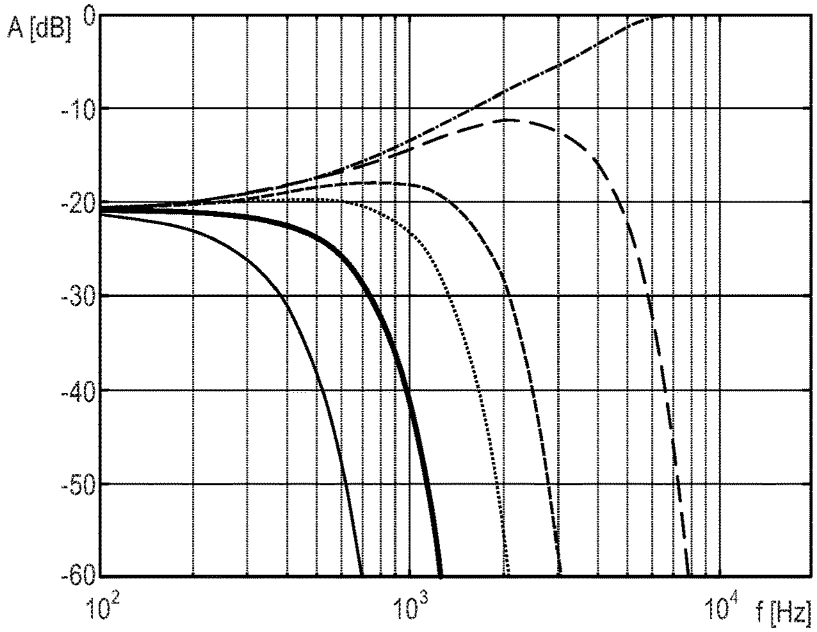
FIG. 3 is a level vs. frequency diagram illustrating resulting frequency responses of exemplary lowpass filters.

FIG. 3 depicts examples of the resulting low pass frequency responses as levels A [dB] vs. frequency f [Hz] of various low pass filters.

Acoustic frequency responses $D_b$ at L discrete points hi (also referred to as listening points) across the listening window having the height H can be computed according to $h_l=l\cdot H/L$, l=0 . . . L. The loudspeakers (transducers) are modeled as vibrating circular pistons in a baffle:

$$D_b(i, l) = \frac{2 \cdot J_1(u_{i,l})}{u_{i,l}},$$

wherein $J_1$ is the first order Bessel function, $$u_{i,l} = q_i \pi \frac{f}{c} \sin(\beta_l),$$

and the off-axis angle $$\beta_l = \mathrm{asin}\left[\frac{h_l - x_i}{x_S}\right],\ x_S = \sqrt{D^2 + (h_l - x_i)^2}.$$

Acoustic frequency responses $H_w(l, f)$ of the loudspeaker arrangement can be described as the complex sum of the frequency responses of all loudspeakers:

$$H_w(l, f) = \sum_{i=1}^{M} \left[ Dl(i, f) \cdot W(i, f) \cdot H_{HP}(i, f) \cdot H_{LP}(i, f) \cdot D_b(i, l) \cdot \frac{D}{x_s} \cdot e^{-j2\pi \frac{f}{c}(x_s - D)} \right].$$

By applying a nonlinear optimization routine, the unknown filter parameters $d_d$, $w_d$, $f_d$, gd can be determined at each frequency point, e.g., by minimizing an error e(f), where $$e(f)=\Sigma_{l=1}^{L} \| \log(|H_W(l, f)| - \log(|H_T(l, f)|)\| ,$$

with bounds applied to the parameter values. In order to simplify the method, in most cases, subsets of parameters can be set constant (excluded from optimization) as, for example, delay time values and high pass filter cut-off frequencies. Finding good initial values close to the final ones can be helpful. The target function $H_T$ (also referred to as CBT target frequency response) may be defined based on an equivalent CBT arc array and is further detailed below. CBT arc arrays are described, e.g., in R. Taylor, K. Manke, D. B. Keele, "Circular-Arc Line Arrays with Amplitude Shading for Constant Directivity". J. Audio Eng. Soc., Vol. 67, No. 6, June 2019.

The CBT target frequency response $H_T$ is derived by computing target responses as a sum of $M_c$ discrete point sources (e.g., loudspeakers) on the surface of the arc according to:

$$H_T(l, f) = \sum_{m=1}^{M_c} W_c(m) \frac{D_c}{x_d(m, l)} e^{-j2\pi \frac{f}{c}[x_d(m,l) - D_c]},$$

where $D_c$ represents the listening distance, $$W_c(m) = \cos^2\left(\frac{\pi}{2} \frac{\beta_c(m)}{\beta_0}\right)$$

represents a shading function (as chosen for this application), wherein $$\beta_c(m) = -\beta_0 + 2m \frac{\beta_0}{M_c}$$

represents a range of the arc angle, $x_d(m,l)=\sqrt{(h_l - r_a \sin(\beta_c(m)))^2 + (D_c + r_a \cos(\beta_c(m)))^2}$ represents the distance of each array element (loudspeaker) to the listening point, and $r_a$ represents the arc radius.

Other shading functions can be used as well as described in R. Taylor, K. Manke, D. B. Keele, "Circular-Arc Line Arrays with Amplitude Shading for Constant Directivity". J. Audio Eng. Soc., Vol. 67, No. 6, June 2019. The underlying nonlinear optimization problem can be solved with common software as, for example, the function "fmincon" (find minimum of constrained nonlinear multivariable function)

of the MATLAB optimization toolbox. MATLAB is a proprietary multi-paradigm programming language and numeric computing environment developed by MathWorks. The function “fmincon” implements four different algorithms, which are the algorithms “interior point”, “sequential quadratic programming (SQP)”, “active set”, and “trust region reflective”, and which can be selected by a flag.

To control the horizontal radiation pattern, a horizontal crossover design is obtained that includes multiple vertical arrays, pointing to different angular room directions. A vertical array is an array of loudspeakers that are vertically aligned. As an example, one front and one rear vertical array, are employed with, for example, a directivity target having the shape of a first order cardioid $P_{cardioid}(\beta)=0.5+0.5\cos(\beta)$. Higher order directivity characteristics can be achieved by adding multiple side arrays.

The following iterative design procedure is based on a set of combined frequency responses $H_{DR}(q,r,i)$ of all vertical arrays of the system at incremental angles (in a horizontal plane) around the cabinet, wherein $q=1, \ldots, Q$ is the angular index, r the array number, and i the frequency index. The system frequency responses at discrete angles q, U(q, i), can be computed as the complex sum of all sources, with (yet unknown) beamforming filters having frequency responses $C_r(i)$ according to:

$$U(q, i)=\Sigma_{r=0}^{n+1} C_r(i) H_{DR}(q, r, i).$$

Real-valued target frequency responses T(q,i) specify the desired horizontal system responses, for example, the above-mentioned first order cardioid function. A nonlinear optimization routine is applied at each frequency point that minimizes the error $$e(i)=\sqrt{\Sigma_{q=1}^{Q} w(q)(|U(|U(q,i)/a|-T(q,i))^2},$$

where w(q) is a weighting function that may be used to improve the result at a desired angle, at the expense of other angles. The parameter a represents a level that specifies how much louder the combined system plays compared to one single driver array. Variables for the nonlinear optimization are magnitude $|C_r(i)|$ and phase $\arg(C_r(i))=\arctan(\mathrm{lm}\{C_r(i)\}/\mathrm{Re}\{C_r(i)\})$ of the unknown beam forming filters.

This bounded, nonlinear optimizations problem can be solved with standard software, for example the function “fmincon” of the Matlab optimization toolbox already mentioned above. The following bounds may be applied:

$G_{max}=20\cdot\log(\max(|C_r|))$, the maximum allowed filter level, and lower and upper limits for the magnitude values from one calculated frequency point to the next point, specified by an input parameter $|C_r(i)|\cdot(1-\delta)<|C_r(i+1)|<|C_r(i)|\cdot(1+\delta)$, in order to control smoothness of the resulting frequency response.

Figure 4:
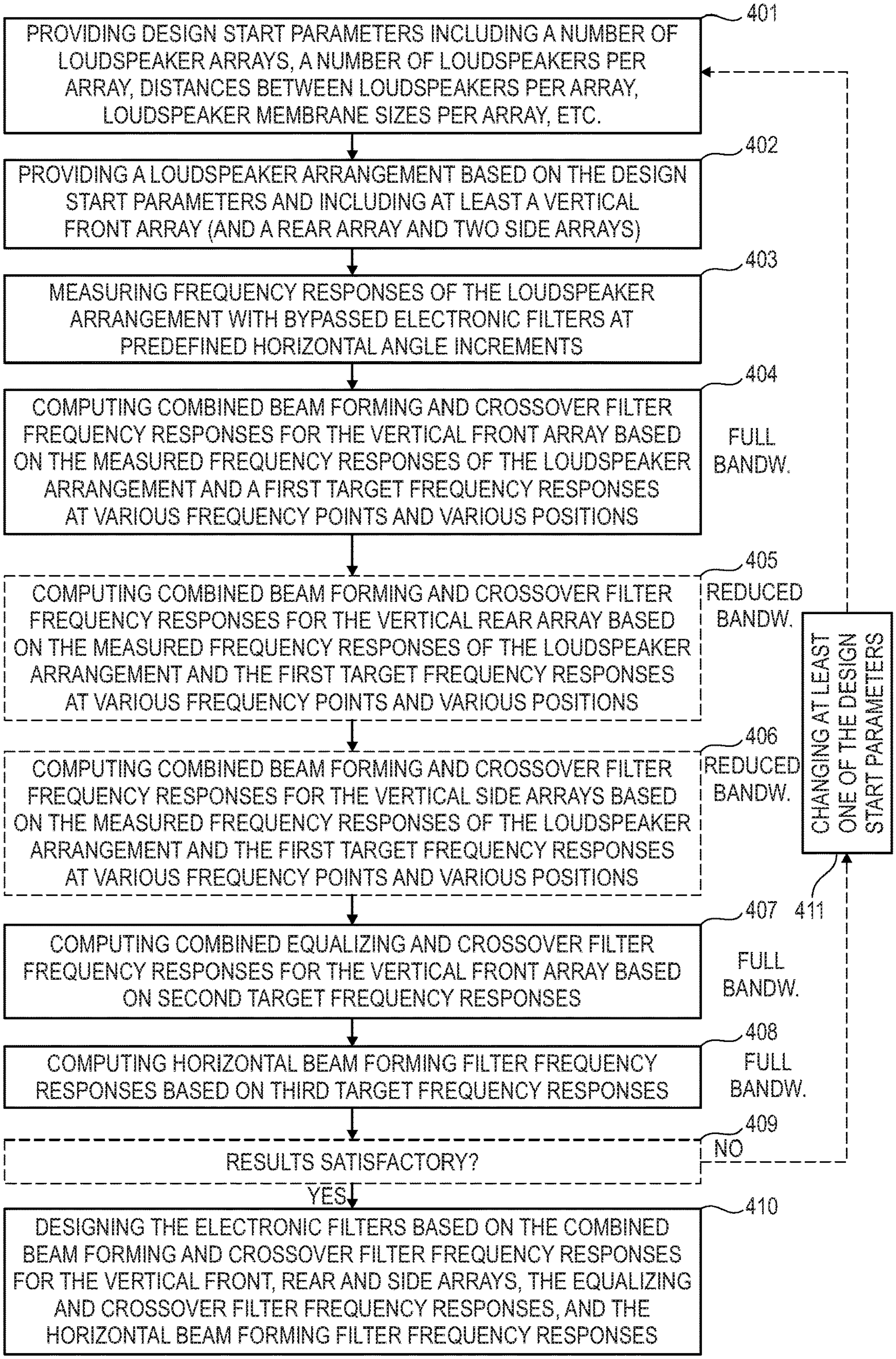
FIG. 4 is a flow chart illustrating an example design method according to the disclosure presented herein.

A flow chart illustrating an example method according to the disclosure presented above is shown in FIG. 4. After going through a number of steps outlined below, a new iteration may be conducted if the result is not satisfactory. Transducer distances, and, as the case may be, the number of transducers and membrane sizes may be adapted before a new iteration round. The sequence of steps in the chart is exemplary and may vary as the case may be.

In a first step 401, design start parameters are provided including a number of (vertical) loudspeaker arrays, a number of loudspeakers per array, distances between loudspeakers per array and loudspeaker membrane sizes per array. For example, an (initial) best guess of the loudspeaker arrangement is made by a designer. The (initial) best guess may be at least the number of vertical arrays, the number of loudspeakers per array, distances between loudspeakers in each array and membrane sizes in each array. Optional further parameters that may be included in the (initial) best guess may include at least one of orientation of the arrays, enclosure shape, and type of loudspeakers (specified by, e.g., at least one of frequency range, power, impedance). The initial best guess or subsequent best guesses may be adapted manually by a designer or automatically by, for example, software, when an/another iteration round is initiated.

In a second step 402, a loudspeaker arrangement is provided which is based on the design start parameters and which includes at least a vertical front array. For example, a prototype enclosure equipped with loudspeakers is provided based on the (initial) best guess of the loudspeaker arrangement according to the first step 401 or to the outcome of a previous iteration round.

In a third step 403, the acoustic frequency responses of the loudspeaker arrangement are measured with any electronic filters, for example, beamforming and crossover filters, connected upstream of the loudspeakers bypassed or omitted, and at predefined horizontal angle increments.

Figure 11:
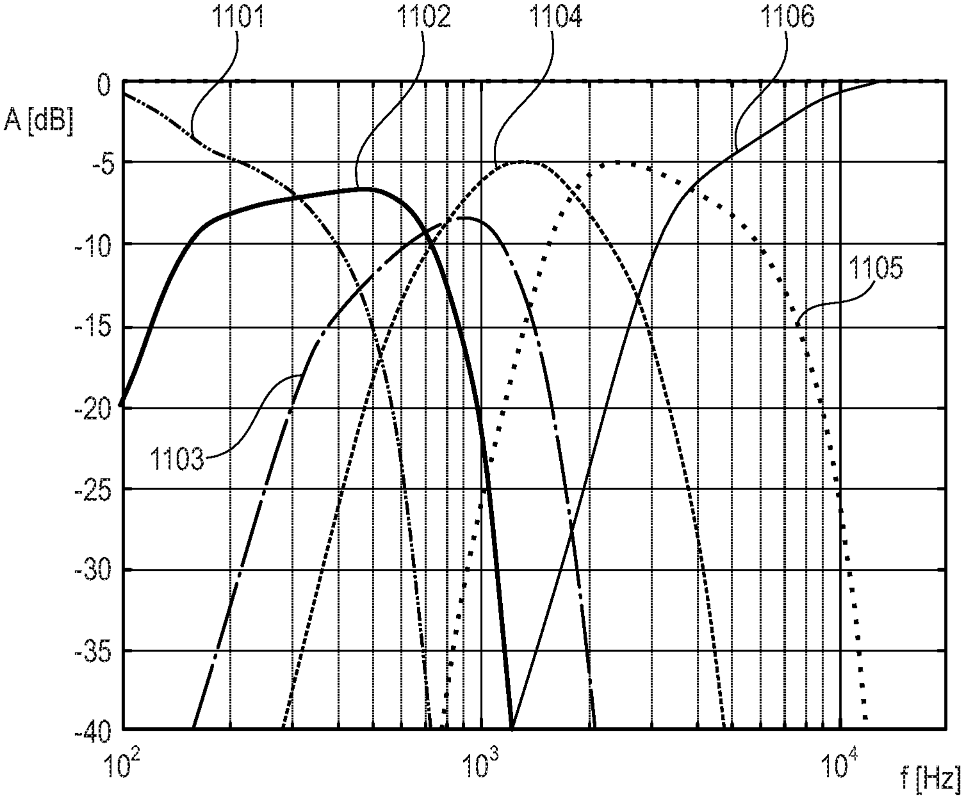
FIG. 11 is a level vs. frequency diagram illustrating crossover transfer functions for the front array (combined front arrays) of the loudspeaker arrangement shown in FIG. 8.

In a fourth step 404, combined beam forming and crossover filter frequency responses for the vertical front array are computed based on the measured frequency responses of the loudspeaker arrangement and first target frequency responses at various frequency points and various positions. The first target frequency responses are constant-beam-width transducer target frequency responses that specify desired frequency responses of the loudspeaker array to be designed. For example, the frequency responses of front vertical beam forming crossover filters, which are filters that combine a beam forming filter and a crossover filter, for example, in a single filter as shown in FIG. 11, and which are represented by the filter parameters dd, wd, fd, gd, are computed for an, for example, full bandwidth front array based on CBT directivity target frequency responses such as, for example, in the way outlined above in connection with and based on the CBT directivity target frequency responses H_T (l,f) and the measured acoustic frequency responses H_w (l,f) of the loudspeaker arrangement resulting from the third step 403.

In an optional fifth step 405, combined beam forming and crossover filter frequency responses for an optional vertical rear array are computed based on the measured frequency responses of the loudspeaker arrangement and the first target frequency responses at various frequency points and various positions in a manner similar to the one outlined above in connection with the fourth step 404.

In an optional sixth step 406, combined beam forming and crossover filter frequency responses for optional vertical side arrays are computed based on the measured frequency responses of the loudspeaker arrangement and the first target frequency responses at various frequency points and various positions in a manner similar to the one outlined above in connection with the fourth step 404.

Figure 5:
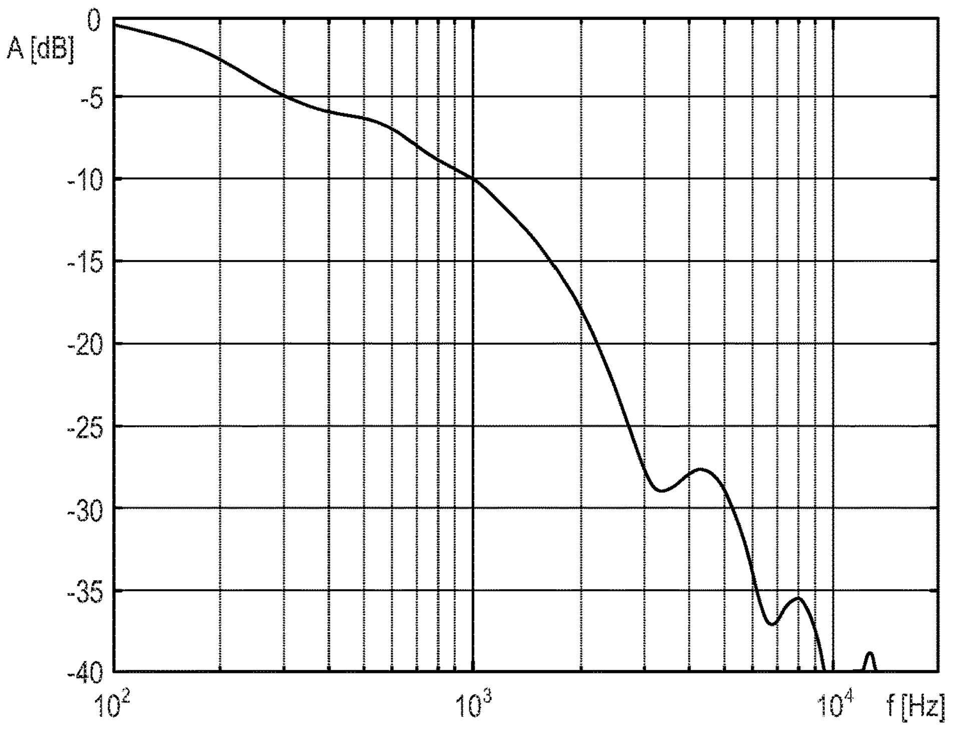
FIG. 5 is a level vs. frequency diagram illustrating an exemplary theoretical rear attenuation over frequency for a cylindrical baffle.
Figure 6:
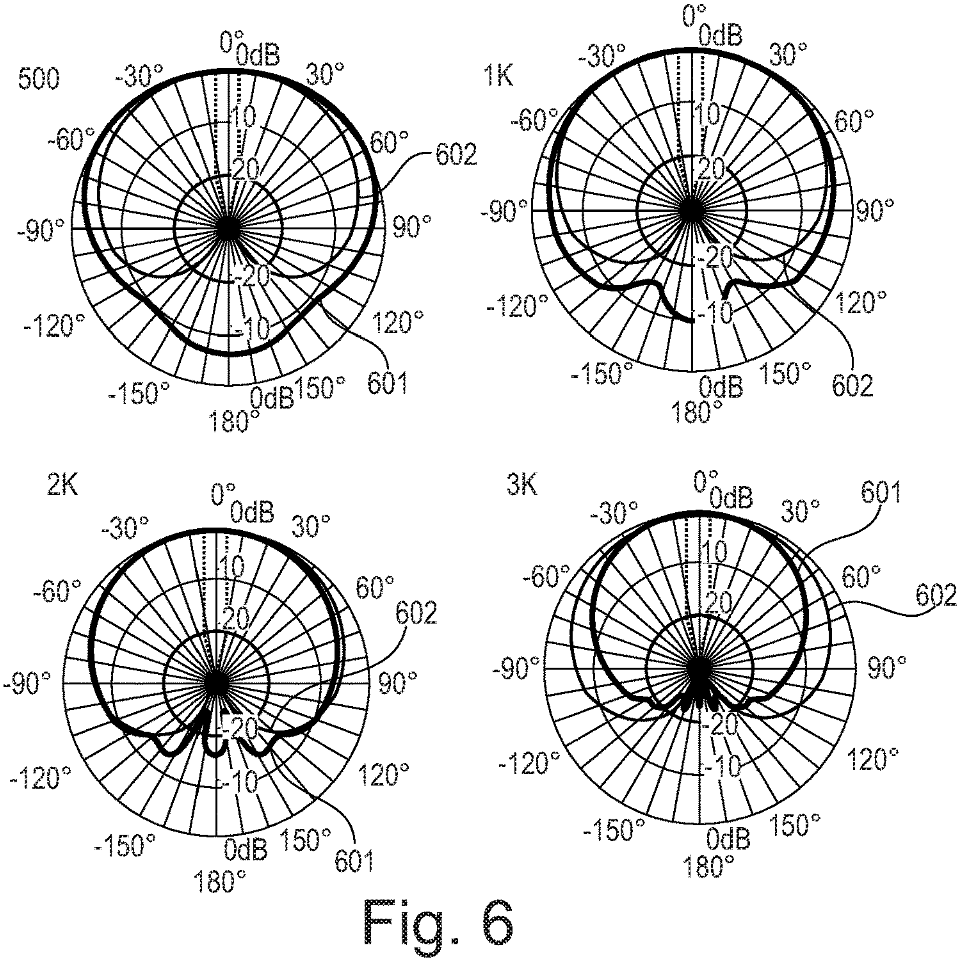
FIG. 6 is a polar diagram illustrating the directivity of a tweeter built into a cylindrical baffle at 500 Hz, 1 KHz, 2 KHz and 3 KHz in comparison with a desired polar directivity.

For example, frequency responses of rear vertical beam forming crossover filters are computed for a rear array based on the CBT directivity target frequency responses $H_T(l, f)$ and the resulting acoustic frequency responses $H_w(l, f)$ of the rear array. Additionally, side beam-forming crossover filters may be designed in a similar manner for at least one optional side array based on the CBT directivity target function $H_T(l, f)$ and the measured acoustic frequency responses $H_w(l, f)$ of the loudspeaker arrangement. Arranging the filters for the rear array and the optional side array(s) includes computing frequency responses of the beam forming crossover filters to be designed, for example, in the way outlined above in connection with and based on the CBT directivity target frequency responses $H_T(l, f)$ and the measured acoustic frequency responses $H_w(l, f)$ of the loudspeaker arrangement. It is noted that the bandwidth of the rear array or of the one or two optional side arrays or of rear and side array(s) may be reduced because sound diffracted around an enclosure experiences a natural attenuation at high frequencies in the form of shadowing. A level vs. frequency diagram illustrating an exemplary theoretical rear attenuation over frequency for a cylindrical baffle having a radius of ra=0.125 m is shown in FIG. 5. For example, attenuation at 3 KHz may be more than 20 dB. Polar plots at 500 Hz, 1 KHz, 2 KHz and 3 KHz shown in FIG. 6 for a 1" tweeter built into a cylindrical baffle of radius of ra=0.125 m confirm this. As outlined, for example, in Earl. G. Williams, *Fourier Acoustics*, Academic Press, 1999, the far field sound pressure P at horizontal angles φ around a long cylinder of radius a, with a short, rectangular membrane of angular radius a built in as sound source, can be computed as follows:

$$P(\varphi) \approx \sum_{n=-K}^{K} \frac{-j^n \mathrm{sinc}(n\alpha)}{H_n'(ka)} e^{jn\varphi},$$

with sinc(x):=sinx/x;

$$H_n' = \frac{nH_n(z)}{z} - H_{n+1}(z)$$

is the derivative of the Hankel function of the first kind $H_n$, k=2πf/c the wave number, and K is the number of terms to be computed for sufficient accuracy (typical K=30). This function P is depicted in FIG. 5 and in FIG. 6 as curves 601, plotted against curves 602 representing a first order cardioid polar characteristic, which is the target of the design to be achieved, $P_{cardioid}(\varphi)=0.5+0.5\cos(\varphi)$.

In a seventh step 407, combined equalizing and crossover filter frequency responses for the vertical front array are computed based on second target frequency responses, the second target frequency responses being the combined beam forming and crossover filter frequency responses for the vertical front array, and the combined equalizing and crossover filter frequency responses being configured to obtain acoustic linear phase responses of the loudspeaker arrangement. The beam forming crossover filters from the fourth step 404 (and fifth step 405 and/or sixth step 406), which may be zero-phase except for the delay vector, are taken as target frequency responses to compute the frequency responses of combined equalizing and crossover filters, for example the filters 707 and 711 in the signal processing structure shown in FIG. 7. The filters are computed as $$H_{CR} = \frac{H_C}{H_M},$$

where $H_C$ represents the target filter frequency responses as a result of the optimization, as outlined above with MatLab function "fmincon", and $H_M$ represents the measured responses. The FIR filter coefficients are g=IFFT{$H_{CR}$}, which allow for acoustic linear phase responses of the loudspeaker arrangement.

In an eighth step 408, computing horizontal beam forming filter frequency responses is based on third target frequency responses (e.g., target frequency responses T(q,i) above). The third target frequency responses specify desired horizontal frequency responses of the loudspeaker array to be designed. For example, the horizontal beamforming filters $C_r$ are implemented as FIR filters in full bandwidth. The second filter and all other filters are normalized to the first filter, yielding for example $$H_{beam,hor} = \frac{C_2}{C_1}.$$

The final FIR filter coefficients are computed as g=IFFT{$H_{beam,hor}$}, implemented, e.g., as filter 708 shown in and described below in connection with FIG. 7, wherein the first filter becomes a pure delay element, e.g., delay element 704 in FIG. 7.

In an optional ninth step 409, it is checked whether the achieved results are satisfactory. This may be performed by measuring the acoustic frequency responses of the loudspeaker arrangement involving all filters.

If the achieved results are satisfactory, in a tenth step 410, the electronic filters are designed based on (e.g., computed from) the combined beam forming and crossover filter frequency responses for the vertical front array, the equalizing and crossover filter frequency responses, and the horizontal beam forming filter frequency responses.

If the achieved results are not satisfactory, in an optional eleventh step 411, at least one of the design start parameters is changed and the steps 401-409 are repeated.

Figure 7:
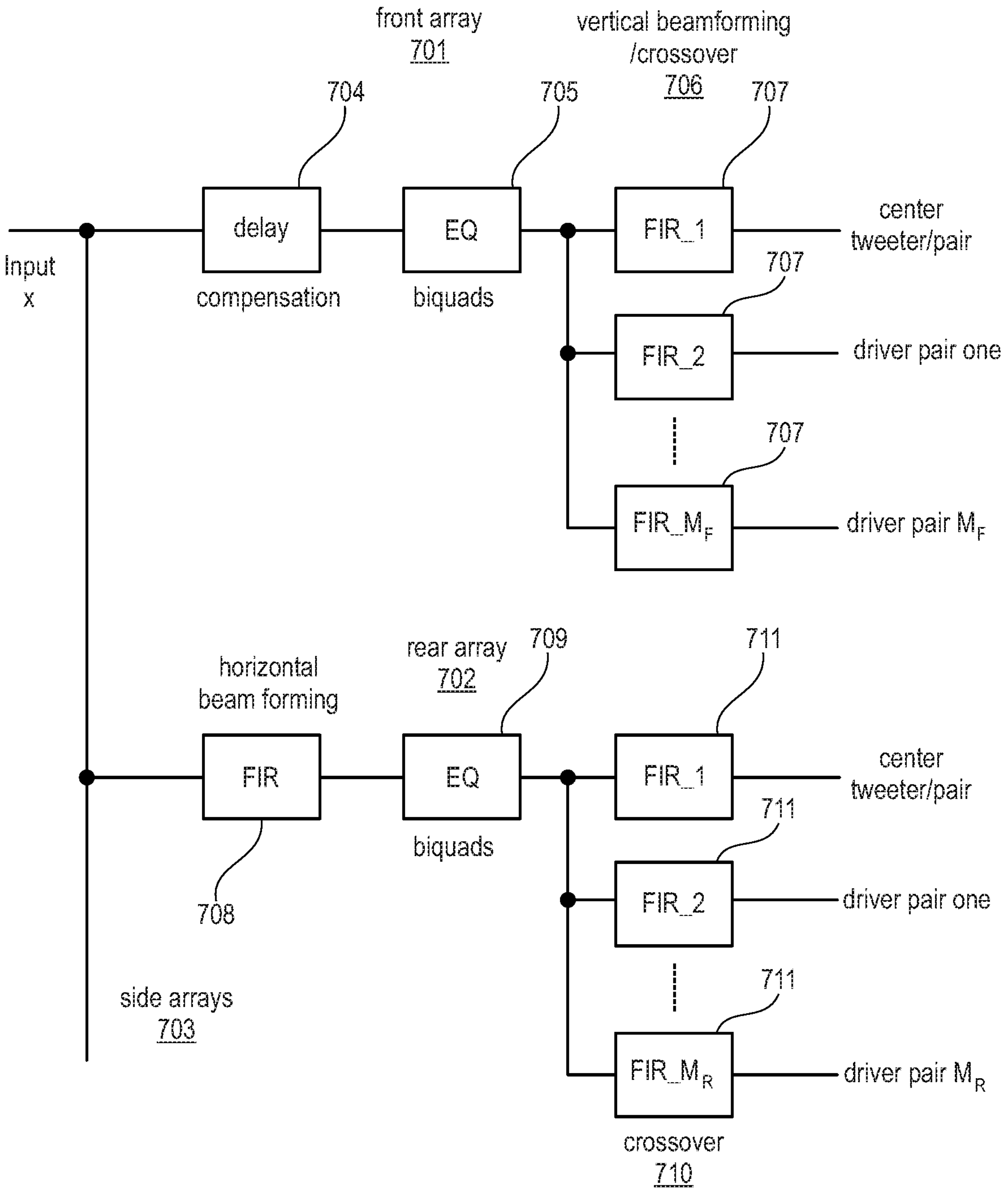
FIG. 7 is a block diagram illustrating a signal processing structure implemented in a digital signal processor and configured to drive the loudspeakers of at least two loudspeaker arrays.

A block diagram of a signal processing structure implemented in a digital signal processor (DSP) and configured to drive the loudspeakers of at least two loudspeaker arrays is shown in FIG. 7. A time-discrete input signal x is supplied to a front array signal path 701, a rear array signal path 702 and an optional side array path 703 (not shown in detail). The front array signal path 701 includes a delay element 704 for delay time compensation, a subsequent frequency equalizer 705 (e.g., implemented by way of a multiplicity of biquad filters) for frequency compensation, and a subsequent vertical beamforming/crossover network 706 (e.g., implemented as a bank of finite impulse response (FIR) filters 707). The rear array signal path 702 includes a FIR filter 708 for horizontal beamforming, a subsequent frequency equalizer 709 (e.g., implemented with a multiplicity of biquad filters) for frequency compensation, and a subsequent crossover network 710 (e.g., implemented as a bank of finite impulse response (FIR) filters 711). The outputs of filters 707 drive the center loudspeaker or the center pair of loudspeakers and the remaining pairs of loudspeakers of the front array. The outputs of filters 711 drive the center loudspeaker or the center pair of loudspeakers and the remaining pairs of loudspeakers of the rear array. Crossover filters and horizontal beam forming filters may be finite impulse response (FIR) filters of length 128 . . . 512.

Figure 8:
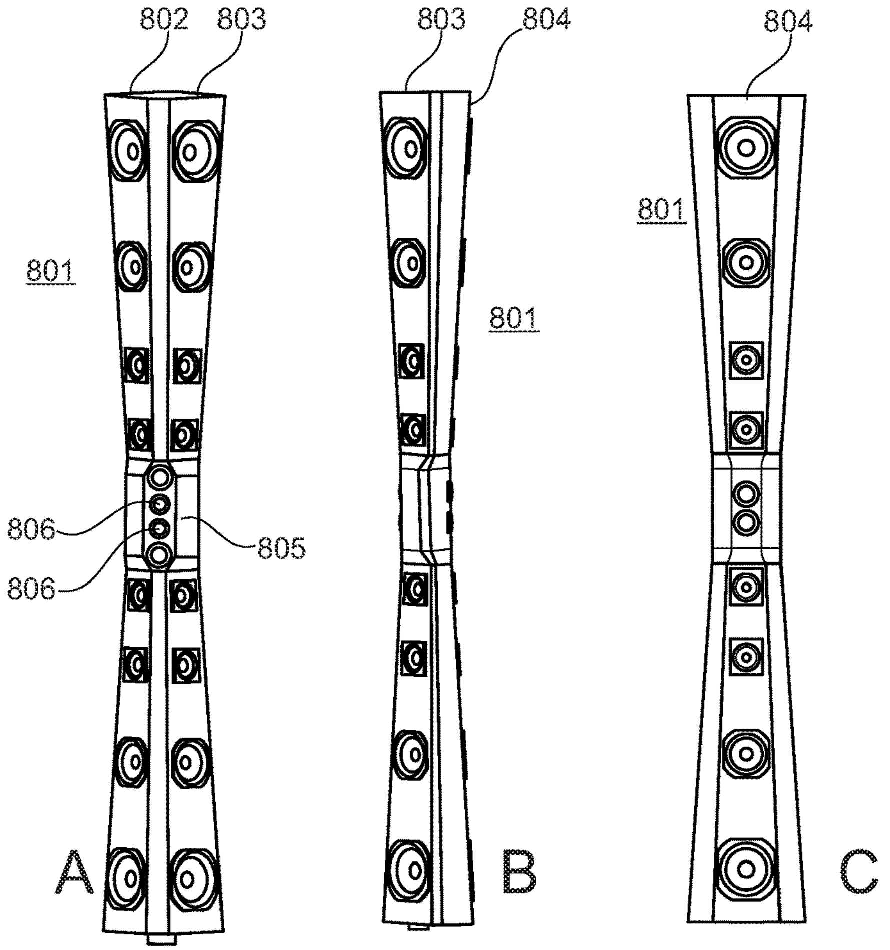
FIG. 8 is a schematic diagram illustrating via three different views a slim-tower generalized line array loudspeaker arrangement including three vertical arrays.
Figure 9:
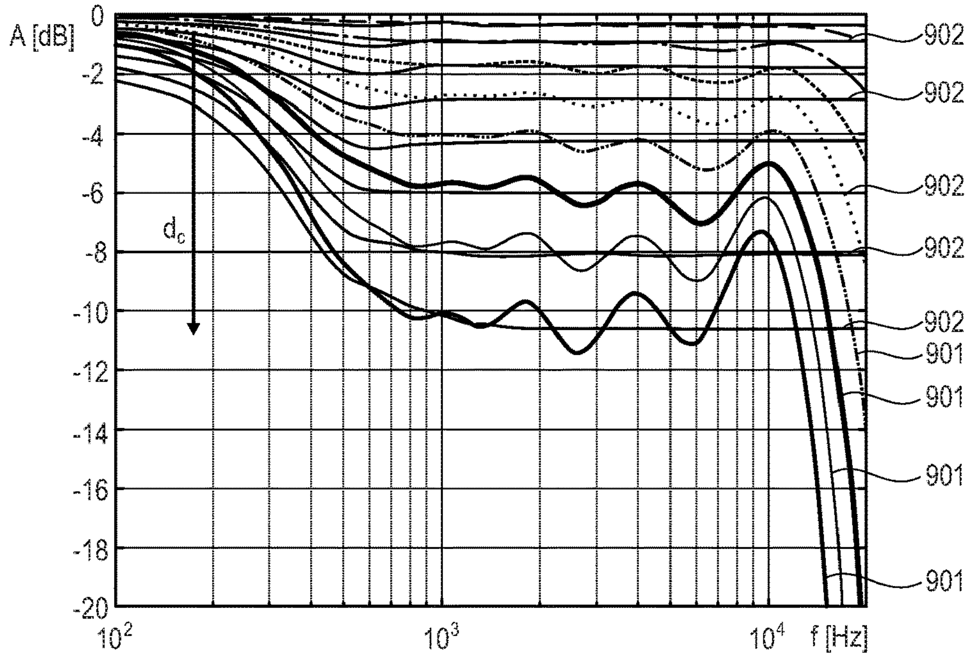
FIG. 9 is a level vs. frequency diagram illustrating frequency responses for various height offsets at a certain distance in the plane of the loudspeaker arrangement shown in FIG. 8 versus a constant-beamwidth transducer target function for the combined front arrays.
Figure 10:
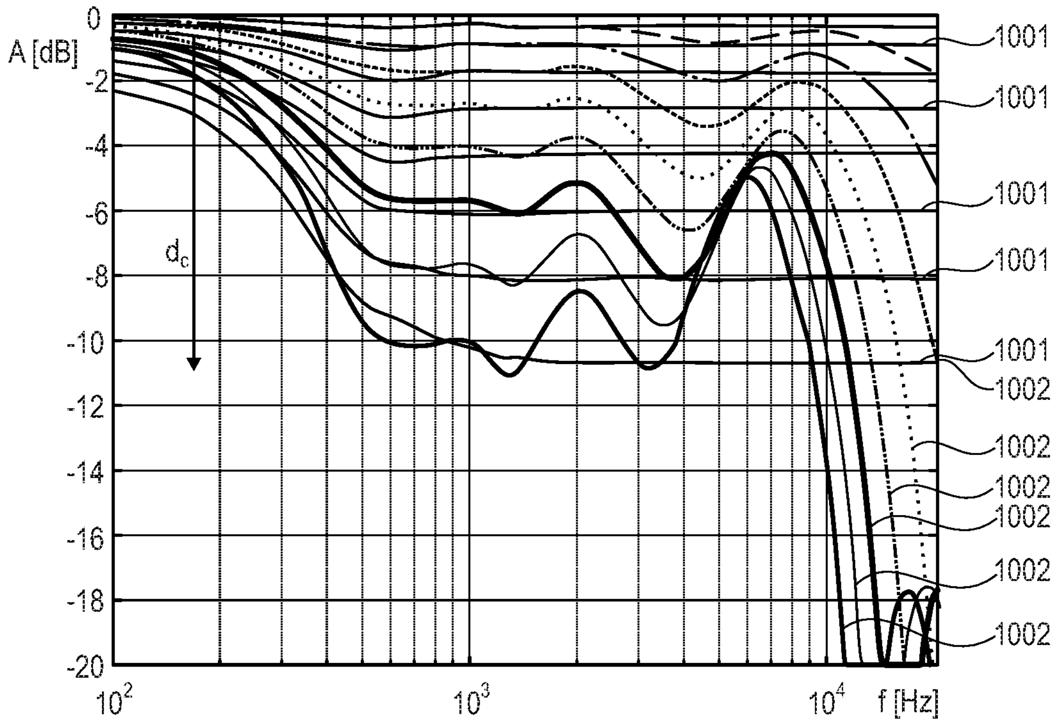
FIG. 10 is a level vs. frequency diagram illustrating frequency responses for various height offsets at a certain distance in the plane of the loudspeaker arrangement shown in FIG. 8 versus the constant-beamwidth transducer target function for the rear array.

As an example, FIG. 8 shows three views A (front view), B (side view) and C (rear view) of a slim tower GLA loudspeaker arrangement 801, including three vertical arrays 802, 803 and 804. The two frontal arrays 802 and 803 share a mutual tweeter section 805, and may be electrically connected in parallel. Two tweeters 806 are disposed in the center of the tweeter section 805 and, thus, the loudspeaker arrangement 801, and electrically connected in parallel. The distance between the two tweeters 806 is chosen such that the resulting vertical directivity matches the directivity of the whole arrays 802 and 803. Overall height may be, for example, about 1.5 meter (m). FIG. 9 shows frequency response plots 901 (level A [dB] vs. frequency f[Hz]) for height offsets 0 . . . H in nine linear steps, with, e.g., H=0.9 m and distance D=2.5 m (see FIG. 1) in the plane of the loudspeaker arrangement 801 plotted against the CBT target 902 for the combined front arrays 802 and 803, and FIG. 10 respective rear frequency plots 1002 versus target functions 1002 for the rear array 804, after nonlinear optimization. As can be seen, the rear array 804 is only accurate up to about 3 KHz. The sound at higher frequencies may be suppressed because of sound shadowing, as explained above.

Figure 12:
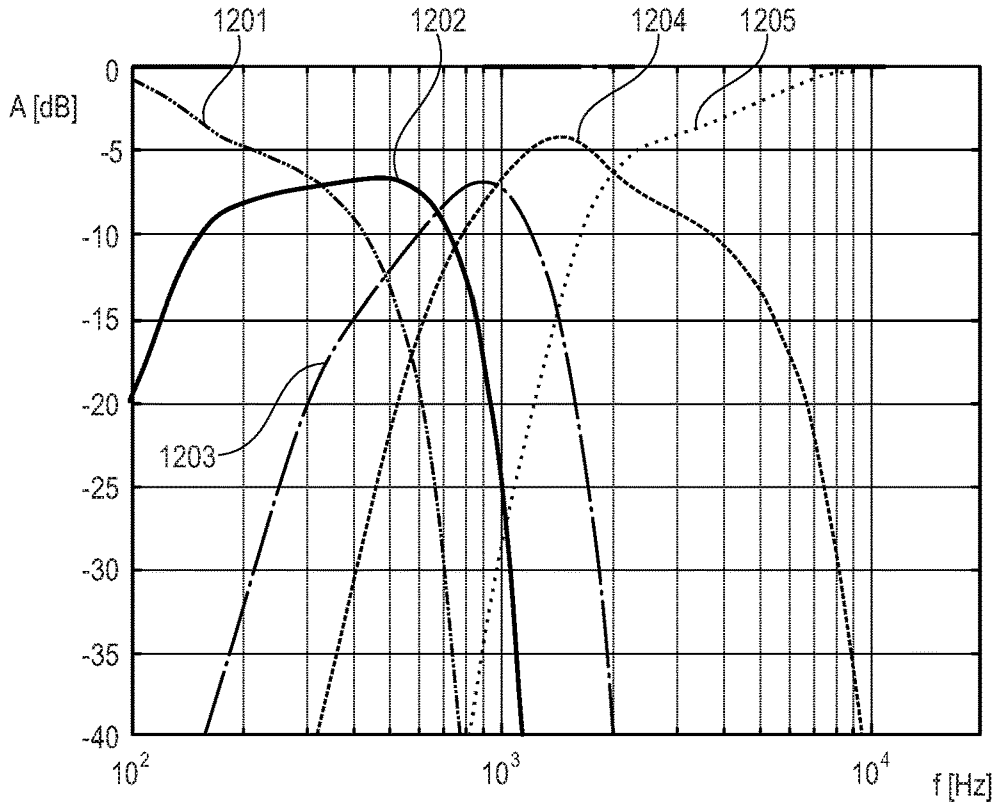
FIG. 12 is a level vs. frequency diagram illustrating crossover transfer functions for the rear array of the loudspeaker arrangement shown in FIG. 8.

The combined front arrays 802 and 803 are controlled by six loudspeaker channels, the rear array 804 by five. FIGS. 11 and 12 show the crossover transfer functions 1101-1106 (front) and 1201-1205 (rear) for the particular channels as level A [dB] vs. frequency f[Hz]. Compared to crossover transfer functions of a conventional loudspeaker, there is more overlap, which is needed to achieve the desired frequency-independent directivity characteristic. Parameters for the design shown in FIG. 8 are for the front array:

$D_m$=5,

X=[0.62 0.42 0.25 0.14 0.069] [meter],

Q=[0.083 0.065 0.047 0.047 0.034 0.073] [meter], $d_d$=0, $w_d$=[8.06 4.55 1.34 0.78 0.67 1 0.67 0.78 1.34 4.55 8.06], $f_d$=[0 150 300 500 1800 3300 1800 500 300 150 0] [Hz], 4th order Butterworth, fixed, $g_d$=[4.53 2.74 1.49 0.62 0.26 0 0.26 0.62 1.49 2.74 4.53], and for the rear array:

$D_m$=4,

X=[0.62 0.42 0.25 0.14] [meter],

Q=[0.083 0.065 0.047 0.047 0.10] [meter], $d_d$=0, $w_d$=[6.62 3.93 1.06 0.42 1 0.42 1.06 3.93 6.62], $f_d$=[0 150 300 500 2000 500 300 150 0] [Hz], 4th order Butterworth, fixed, $g_d$=[4.39 2.96 1.54 0.31 0 0.31 1.54 2.96 4.39].

Figure 13:
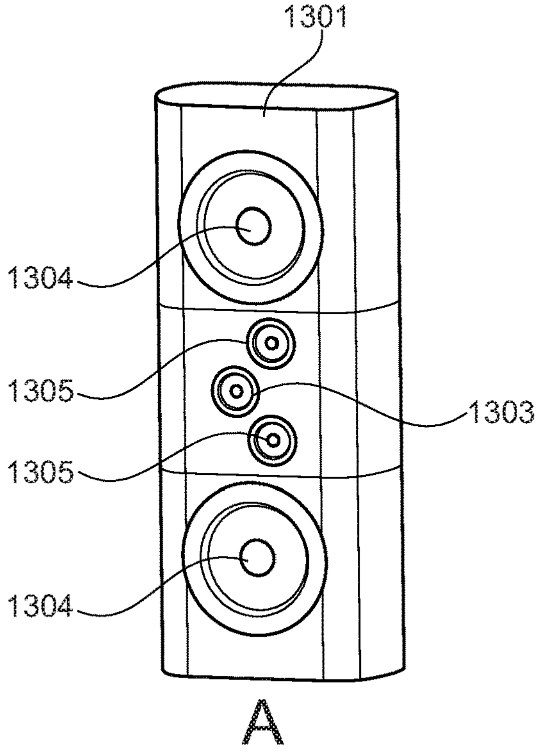
FIG. 13 is a schematic diagram illustrating an example loudspeaker arrangement with a minimum number of channels possible.
Figure 14:
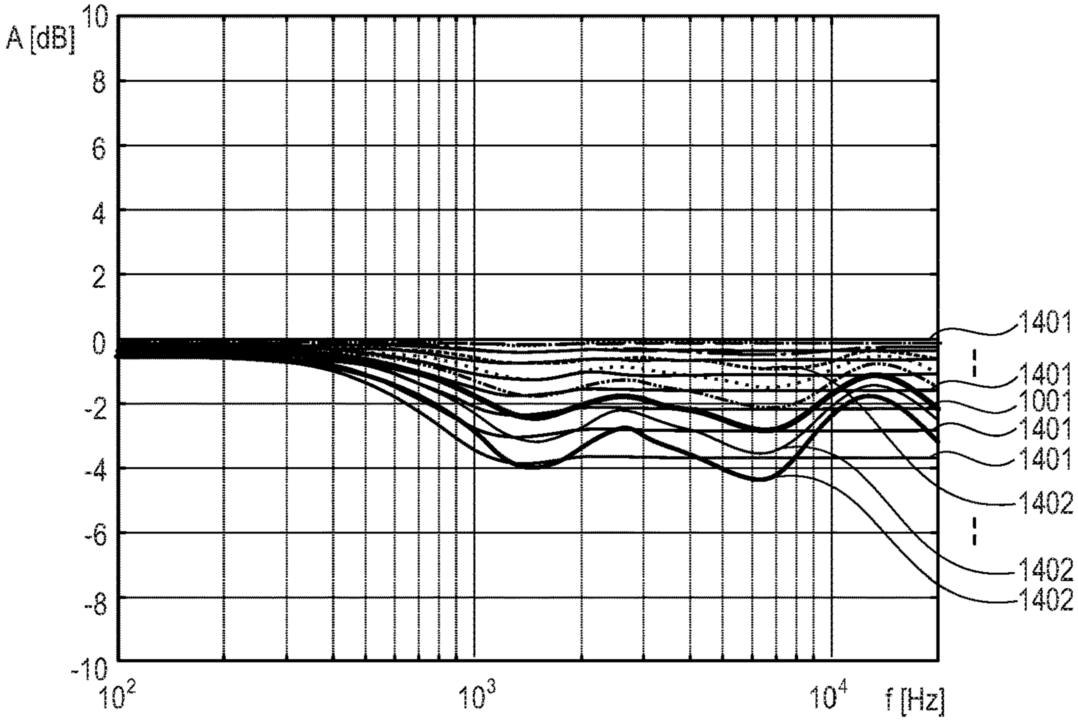
FIG. 14 is a level vs. frequency diagram illustrating vertical frequency responses of the front array of the loudspeaker arrangement shown in FIG. 13 compared to curves provided by a constant-beamwidth transducer target function.
Figure 15:
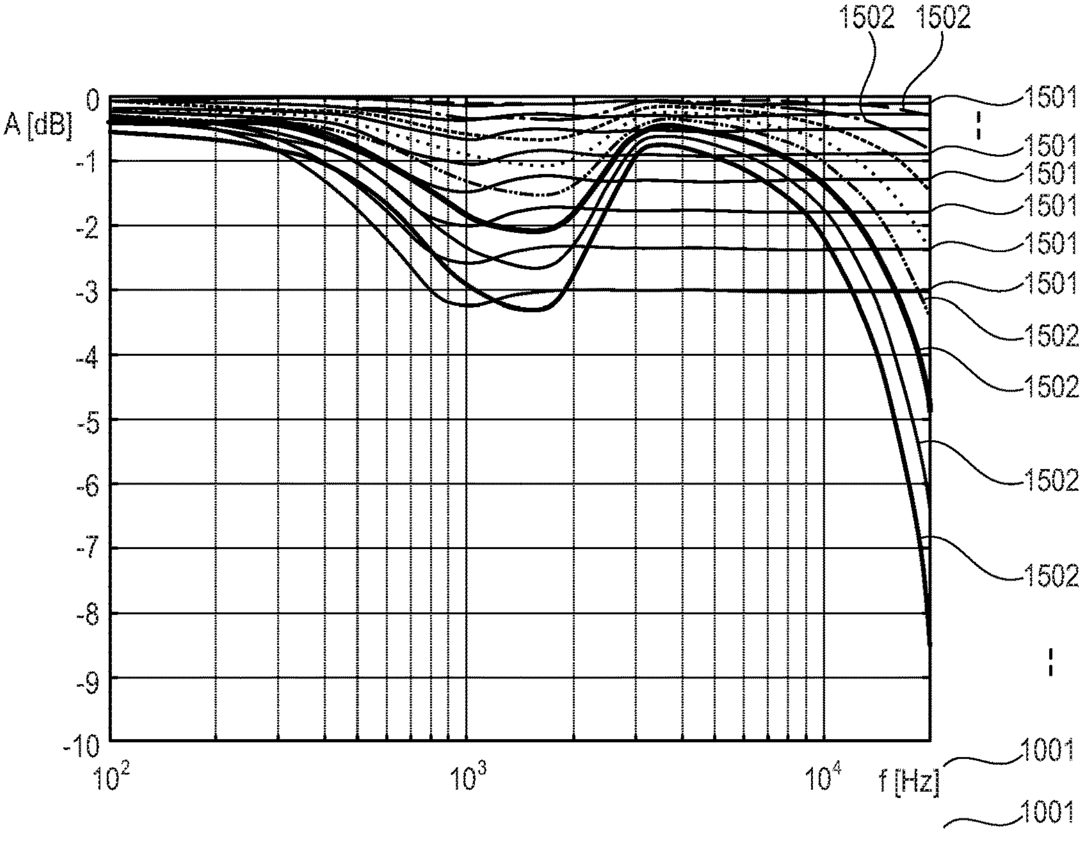
FIG. 15 is a level vs. frequency diagram illustrating vertical frequency responses of the rear array of the loudspeaker arrangement shown in FIG. 13 compared to curves provided by a constant-beamwidth transducer target function.
Figure 16:
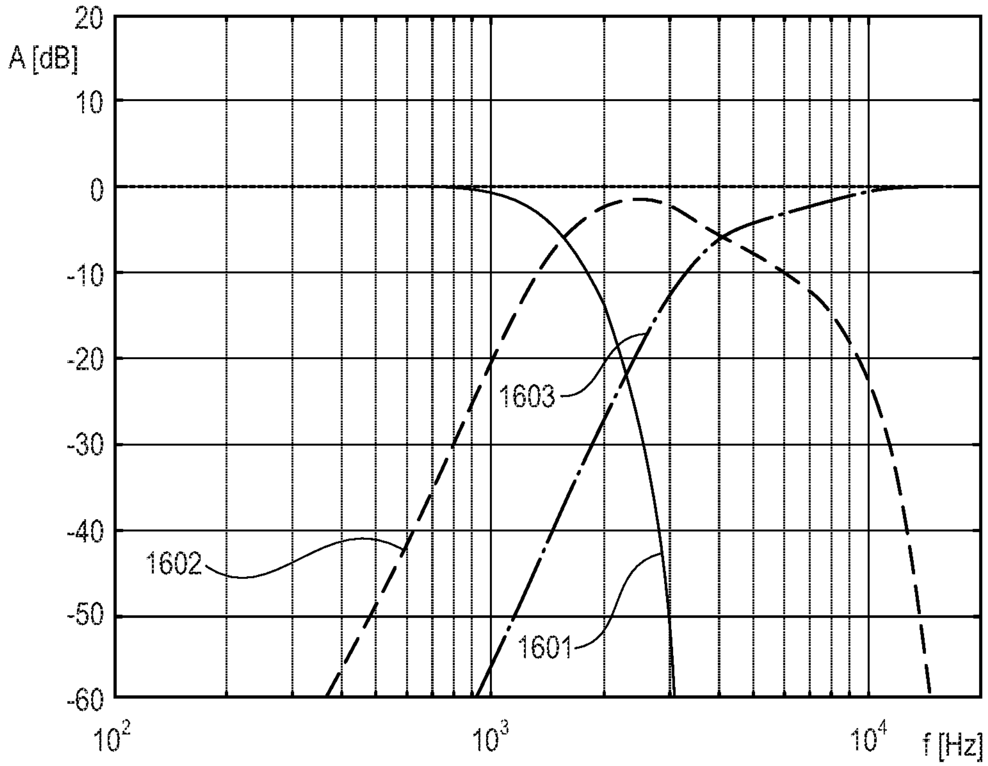
FIG. 16 is a level vs. frequency diagram illustrating crossover transfer functions for the front array (combined front arrays) of the loudspeaker arrangement shown in FIG. 13.
Figure 17:
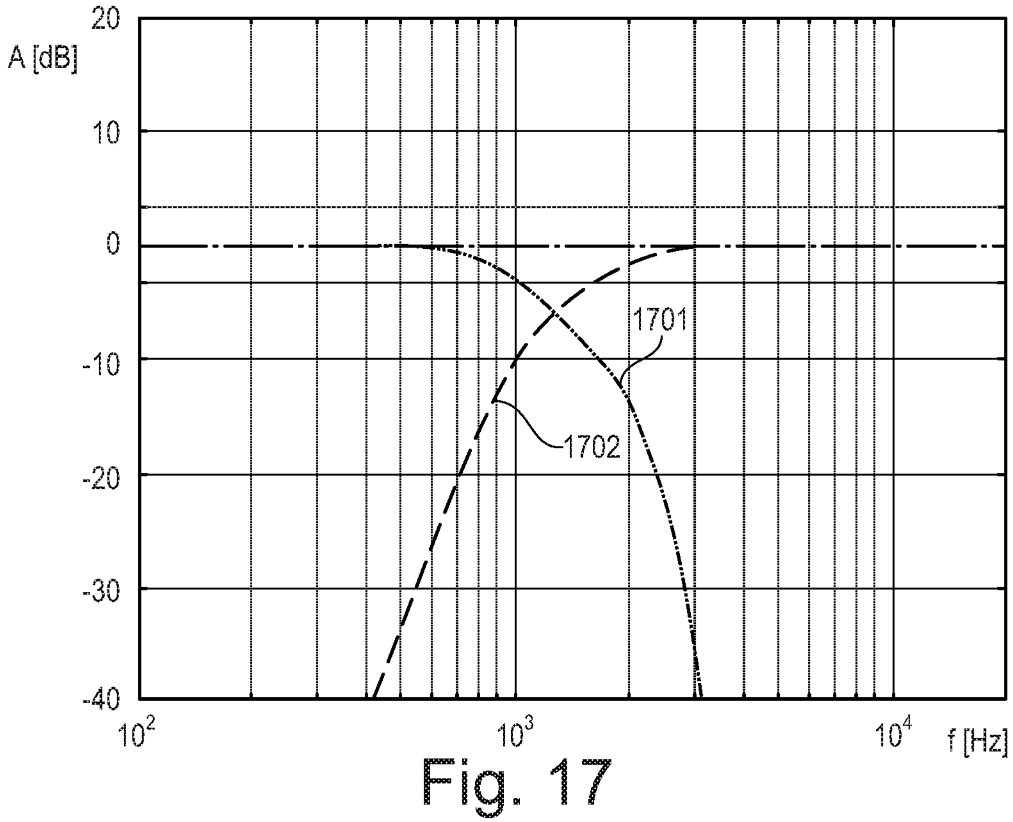
FIG. 17 is a level vs. frequency diagram illustrating crossover transfer functions for the rear array of the loudspeaker arrangement shown in FIG. 13.

An example configuration with the minimum number of loudspeaker channels possible, but which is still in accordance with this disclosure, is shown in FIG. 13. It includes a compact, bookshelf type loudspeaker arrangement 1301 with a three-channel front array 1301 (view A) and a two-channel rear array 1302 (view B). The front array 1301 includes three tweeters 1303 in the center of the front array 1301 and two woofers 1304 distant from this center. The rear array 1302 includes a midrange 1306 in the center of the rear array 1302 and two woofers 1304 distant from this center. The corresponding vertical frequency response plots with 1402 (front array) and 1502 (rear array) versus CBT targets 1401 (front array) and 1501 (rear array) are shown in FIGS. 14 (front array) and 15 (rear array), the corresponding crossover responses 1601-1603 (front array) and 1701 and 1702 (rear) are shown in FIGS. 16 (front array) and 17 (rear array).

Figure 18:
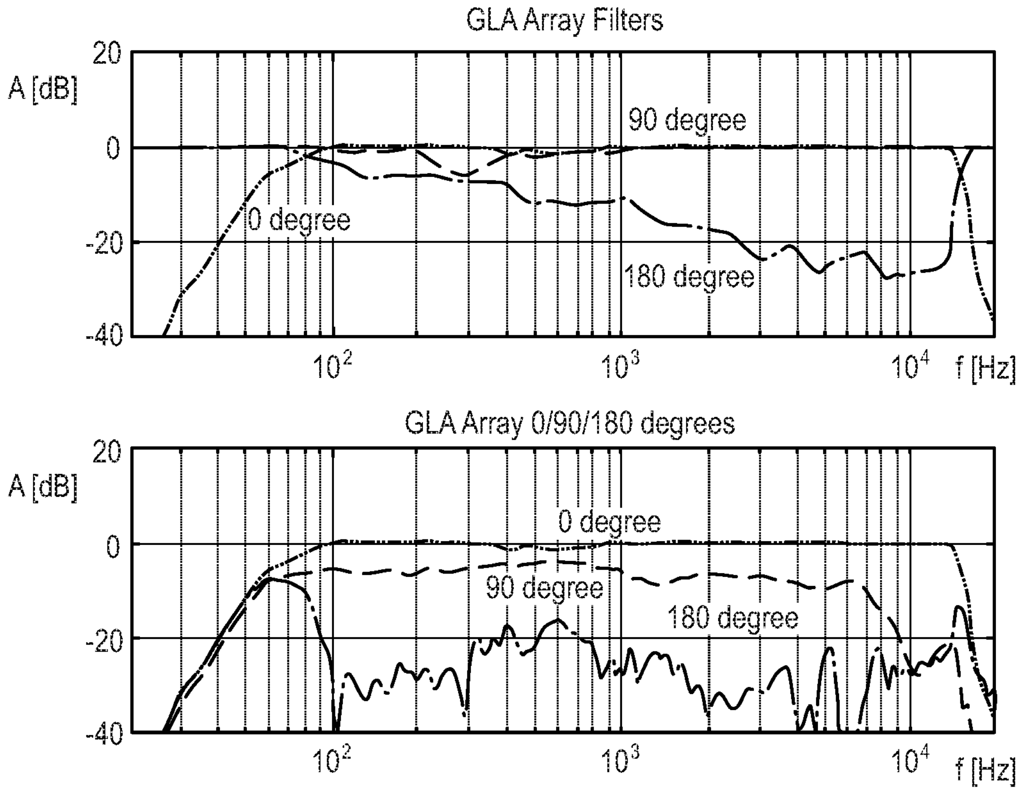
FIG. 18 includes two level vs. frequency diagrams illustrating frequency responses horizontally at 0°, 90° and 180° in the lower diagram of the loudspeaker arrangement shown in FIG. 13, and horizontal beam filter responses thereof in the upper diagram, as a result of an iteration process.

FIG. 18 depicts frequency responses (level A [dB] vs. frequency f [Hz]) horizontally at 0°, 90° and 180° (see lower diagram) of a loudspeaker front array 1301, the horizontal beam filter responses of which are shown in the upper diagram, as a result of an iteration process as described above in connection with the horizontal beamforming crossover design. As predicted, there is more than 20 dB attenuation of the rear filter response above 3 KHz. The design parameters are for the front array 1301:

$D_m$=2,

X=[0.12 0.045] [meter],

Q=[0.08 0.025 0.025] [meter], $d_d$=0, $w_d$=[1.82 0.56 1 0.56 1.82], $f_d$=[0 1500 4000 1500 0] [Hz], 4th order Butterworth, fixed, $g_d$=[1.2 0.24 0 0.24 1.2], and for the rear array 1302:

$D_m$=1,

X=[0.14] [meter],

Q=[0.08 0.04] [meter], $d_d$=0, $w_d$=[0.77 1 0.77], $f_d$=[0 1200 0] [Hz], 4th order BW, fixed, $g_d$[1.0 0 1.0]

The method may be implemented via software and/or firmware stored on or in a computer-readable medium, machine-readable medium, propagated-signal medium, and/or signal-bearing medium. The media may comprise any device that includes, stores, communicates, propagates, or transports executable instructions for use by or in connection with an instruction executable system, apparatus, or device. The machine-readable medium may selectively be, but is not limited to, an electronic, magnetic, or a semiconductor system, apparatus, device, or propagation medium.

The systems may include additional or different logic and may be implemented in many different ways, e.g., as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature and may include additional elements and/or omit elements.

As used in this application, an element or step recited in the singular and proceeded with the word “a” or “an” should be understood as not excluding plural of said elements or steps, unless such exclusion is stated. Furthermore, references to “one embodiment” or “one example” of the present disclosure are not intended to be interpreted as excluding the existence of additional embodiments that also incorporate the recited features. The terms “first,” “second,” and “third,” etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

What is claimed is:

1. A method for providing a line array loudspeaker arrangement, the loudspeaker arrangement comprising electronic filters and a loudspeaker enclosure equipped with loudspeakers that are connected to the filters, have a membrane and are arranged to form at least one array; the method comprising:

providing design start parameters including a number of loudspeaker arrays, a number of loudspeakers per array, distances between loudspeakers per array and loudspeaker membrane sizes per array;

providing a loudspeaker arrangement based on the design start parameters and including at least a vertical front array, measuring frequency responses of the loudspeaker arrangement with bypassed or omitted electronic filters at predefined horizontal angle increments;

computing combined beam forming and crossover filter frequency responses for the vertical front array based on the measured frequency responses of the loudspeaker arrangement and first target frequency responses at various frequency points and various positions, the first target frequency responses being constant-beam-width transducer target frequency responses that specify desired frequency responses of the loudspeaker array to be provided;

computing combined equalizing and crossover filter frequency responses for the vertical front array based on second target frequency responses, the second target frequency responses being the combined beam forming and crossover filter frequency responses for the vertical front array, and the combined equalizing and crossover filter frequency responses being configured to obtain acoustic linear phase responses of the loudspeaker arrangement;

computing horizontal beam forming filter frequency responses based on third target frequency responses, the third target frequency responses specify desired horizontal frequency responses of the loudspeaker array to be provided; and providing the electronic filters based on the combined beam forming and crossover filter frequency responses for the vertical front array, the equalizing and crossover filter frequency responses, and the horizontal beam forming filter frequency responses.

2. The method of claim 1, wherein the line array loudspeaker arrangement further comprises a vertical rear array, the method further comprising computing beam forming and crossover filter responses for the vertical rear array based on the measured frequency responses of the loudspeaker arrangement and the first target frequency responses at various frequency points and various positions.

3. The method of claim 1, wherein the line array loudspeaker arrangement further comprises at least one vertical side array, the method further comprising computing beam forming and crossover filter responses for the at least one vertical side array based on the measured frequency responses of the loudspeaker arrangement and the first target frequency responses at various frequency points and various positions.

4. The method of claim 1, further comprising changing at least one of the design start parameters and repeating at least: providing the loudspeaker arrangement, measuring the frequency responses of the loudspeaker arrangement, computing the combined beam forming and crossover filter responses for the vertical front array, computing the combined equalizing and crossover filter frequency responses for the vertical front array, and computing the horizontal beam forming filter frequency responses.

5. The method of claim 1, wherein the design start parameters further include at least one of number of vertical arrays, orientation of arrays, shape of enclosure, and a type of loudspeaker.

6. The method of claim 1, wherein computing the combined beam forming and crossover filter frequency responses for the vertical front array is performed over a full operation bandwidth of the loudspeaker array.

7. The method of claim 1, wherein at least one of: computing the beam forming and crossover filter responses for a vertical rear array and computing the beam forming and crossover filter responses for at least one vertical side array is performed with a bandwidth smaller than a full operation bandwidth of the loudspeaker array.

8. The method of claim 1, wherein a constant-beam-width transducer directivity target is derived by computing a sum of a number of discrete point sources on a surface of an arc.

9. The method of claim 8, wherein the constant-beam-width transducer directivity target is dependent on a shading function.

10. The method of claim 1, further comprising at least one of computing a first vertical beam forming crossover filter parameters for the front array and computing second vertical beam forming crossover filter parameters for a vertical rear array, wherein the at least one of computing the first vertical beam forming crossover filter parameter and computing the second vehicle beam forming crossover filter parameters further comprises executing an optimization procedure that minimizes at each frequency point a first error that corresponds with a difference between the measured frequency response of the loudspeaker arrangement and the constant-beam-width transducer directivity target frequency responses.

11. The method of claim 10, wherein the optimization procedure is non-linear.

12. The method of claim 10, wherein acoustic frequency responses of the loudspeaker arrangement are a complex sum of the frequency responses of all loudspeakers at different angles.

13. The method of claim 10, wherein computing the horizontal beam forming filter frequency responses comprises a non-linear optimization by minimizing at each frequency point a second error that corresponds with the difference between the measured frequency response of the loudspeaker arrangement and the third target frequency responses at predefined horizontal angle increments.

14. The method of claim 13, wherein the various positions at which the combined beam forming and crossover filter frequency responses for the vertical front array are computed are within a vertically and horizontally extending listening window at a listening distance from a center of the loudspeaker arrangement.

15. A method for providing a line array loudspeaker arrangement, the loudspeaker arrangement comprising electronic filters and a loudspeaker enclosure equipped with loudspeakers that are connected to the filters, the loudspeakers forming at least one array; the method comprising:

providing design start parameters including a number of loudspeaker arrays, a number of loudspeakers per array, and distances between loudspeakers per array;

providing a loudspeaker arrangement based on the design start parameters and including at least a vertical front array, measuring frequency responses of the loudspeaker arrangement with bypassed or omitted electronic filters at predefined horizontal angle increments;

determining combined beam forming and crossover filter frequency responses for the vertical front array based on the measured frequency responses of the loudspeaker arrangement and first target frequency responses at various frequency points and various positions, the first target frequency responses being constant-beam-width transducer target frequency responses that specify desired frequency responses of the loudspeaker array to be provided;

determining combined equalizing and crossover filter frequency responses for the vertical front array based on second target frequency responses, the second target frequency responses being the combined beam forming and crossover filter frequency responses for the vertical front array, and the combined equalizing and crossover filter frequency responses being configured to obtain acoustic linear phase responses of the loudspeaker arrangement;

determining horizontal beam forming filter frequency responses based on third target frequency responses, the third target frequency responses specify desired horizontal frequency responses of the loudspeaker array to be provided; and providing the electronic filters based on the combined beam forming and crossover filter frequency responses for the vertical front array, the equalizing and crossover filter frequency responses, and the horizontal beam forming filter frequency responses.

16. The method of claim 15, wherein the line array loudspeaker arrangement further comprises a vertical rear array, the method further comprising computing beam forming and crossover filter responses for the vertical rear array based on the measured frequency responses of the loudspeaker arrangement and the first target frequency responses at various frequency points and various positions.

17. The method of claim 15, wherein the line array loudspeaker arrangement further comprises at least one vertical side array, the method further comprising computing beam forming and crossover filter responses for the at least one vertical side array based on the measured frequency responses of the loudspeaker arrangement and the first target frequency responses at various frequency points and various positions.

18. The method of claim 15, further comprising changing at least one of the design start parameters and repeating at least: providing the loudspeaker arrangement, measuring the frequency responses of the loudspeaker arrangement, computing the combined beam forming and crossover filter responses for the vertical front array, computing the combined equalizing and crossover filter frequency responses for the vertical front array, and computing the horizontal beam forming filter frequency responses.

19. The method of claim 15, wherein the design start parameters further include at least one of number of vertical arrays, orientation of arrays, shape of enclosure, and a type of loudspeaker.

20. A computer-program product embodied in a non-transitory computer readable medium that is programmed for providing a line array loudspeaker arrangement, the line array loudspeaker arrangement comprising electronic filters and a loudspeaker enclosure equipped with loudspeakers that are connected to the filters, the loudspeakers forming at least one array, the computer-program product comprising instructions for:

receiving design start parameters including a number of loudspeaker arrays, a number of loudspeakers per array, and distances between loudspeakers per array;

receiving information corresponding to a loudspeaker arrangement based on the design start parameters and including at least a vertical front array, measuring frequency responses of the loudspeaker arrangement with bypassed or omitted electronic filters at predefined horizontal angle increments;

determining combined beam forming and crossover filter frequency responses for the vertical front array based on the measured frequency responses of the loudspeaker arrangement and first target frequency responses at various frequency points and various positions, the first target frequency responses being constant-beam-width transducer target frequency responses that specify desired frequency responses of the loudspeaker array to be provided;

determining combined equalizing and crossover filter frequency responses for the vertical front array based on second target frequency responses, the second target frequency responses being the combined beam forming and crossover filter frequency responses for the vertical front array, and the combined equalizing and crossover filter frequency responses being configured to obtain acoustic linear phase responses of the loudspeaker arrangement;

determining horizontal beam forming filter frequency responses based on third target frequency responses, the third target frequency responses specify desired horizontal frequency responses of the loudspeaker array to be provided; and providing the electronic filters based on the combined beam forming and crossover filter frequency responses for the vertical front array, the equalizing and crossover filter frequency responses, and the horizontal beam forming filter frequency responses.

* * * * *